No. 854,157. PATENTED MAY 21, 1907.
C. ELLIS & B. E. ELDRED.
PROCESS OF GENERATING HYDROGEN.
APPLICATION FILED OCT. 21, 1905.
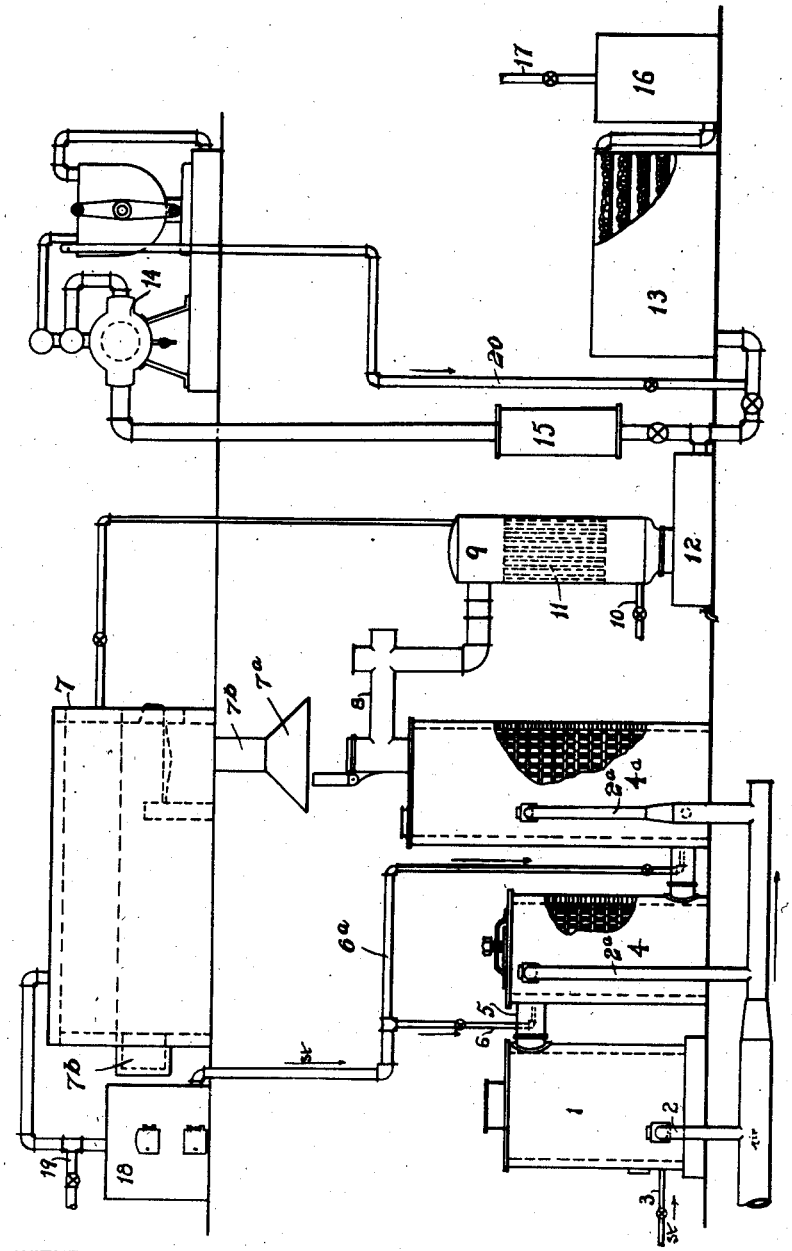
WITNESSES:  
INVENTORS  
Carleton Ellis  
Byron E. Eldred  
BY Carleton Ellis  
ATTORNEY

UNITED STATES PATENT OFFICE.

CARLETON ELLIS, OF WHITE PLAINS, AND BYRON E. ELDRED, OF BRONX-VILLE, NEW YORK, ASSIGNORS TO COMBUSTION UTILITIES COMPANY, OF NEW YORK, N. Y., A CORPORATION OF NEW YORK.

PROCESS OF GENERATING HYDROGEN.

No. 854,157. Specification of Letters Patent. Patented May 21, 1907.

Application filed October 21, 1905. Serial No. 283,858.

*To all whom it may concern:*

Be it known that we, CARLETON ELLIS and BYRON E. ELDRED, citizens of the United States, and residents of White Plains and Bronxville, respectively, in the county of Westchester and State of New York, have invented certain new and useful Improvements in Processes for Generating Hydrogen, of which the following is a specification.

This invention relates to process for the conversion of carbon monoxid into carbon dioxid, with the formation of hydrogen, in gaseous mixtures containing hydrogen and carbon monoxid, such for instance as water gas or "blue gas," and in the subsequent separation of the hydrogen.

The cheap generation of hydrogen in large quantities has been a problem offering great difficulty of solution. The demand for hydrogen in large quantities is considerable, owing to its widespread use in inflating balloons. Electrolytic hydrogen is expensive even when prepared by cheap electric power. The cost of generating hydrogen by the acid process is very high. Water-gas, so largely used in the carbureted form for purposes of illumination, contains from 30 to 40 percent. of hydrogen associated with carbon monoxid, carbon dioxid, nitrogen, etc. The carbon dioxid is capable of easy removal by washing with caustic solutions or otherwise. Carbon monoxid cannot be removed economically by absorption. Nitrogen is generally present in so small an amount that its presence is not objectionable; moreover its specific gravity being less than that of air the quantity of nitrogen present after removal of carbon monoxid and carbon dioxid would not be sufficient to impair materially the buoyant action of hydrogen. As it is impossible commercially to wash out or remove the carbon monoxid, *per se,* other methods must be employed for its separation from such mixture.

The present invention contemplates the oxidation of carbon monoxid to carbon dioxid in water gas mixtures or in mixtures similar in composition to water gas. We have found that steam has an oxidizing action on carbon monoxid at elevated temperatures wholly suited for carrying out the separation involved. When a mixture of steam and carbon monoxid is passed through heated tubes or exposed to high temperatures an endothermic reaction takes place resulting in the formation of carbon dioxid in greater or less amount, depending upon the temperature and the proportion of the reacting constituents. The reaction is expressed as follows:—

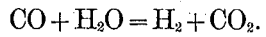
$$CO + H_2O = H_2 + CO_2.$$

The reaction may easily be caused to take place by heating water-gas with steam or water to about 1,150° C and this reaction constitutes the basis of the present invention for the production of hydrogen on a large scale and cheaply from water-gas or from pure carbon monoxid. We believe that the reaction has been heretofore noted, but we believe that we are the first to have discovered that this reaction, heretofore apprehended theoretically, is of commercial importance in the practical art of making hydrogen. For this purpose means may be employed as disclosed in the accompanying diagrammatic drawing which represents an elevation of the apparatus.

In the drawing 1 is a water-gas generator adapted to contain a mass of fuel through which air and steam are blown in alternation.

2 is a pipe for the admission of air.

3 is a pipe for the admission of steam.

At 4 and 4ª are shown reaction chambers in which the carbon monoxid is oxidized to carbon dioxid. As shown these contain a mass of checker work made, as usual, of firebrick or other refractory material and have inlets 2-ª for the admission of air similar to the carbureter and superheater used in the manufacture of illuminating gas from water-gas.

5 is a passage connecting the generator with the chamber 4 and containing the steam jet 6.

Branch pipe 6-ª allows steam to be added to the hot gaseous admixture going into the second checkerwork 4-ª if it be desired to add the steam in portions.

8 is a conduit for the discharge of the products of reaction.

7 is a steam generator arranged to receive the hot products of the air blow through the funnel shaped collector, 7-ᵃ and transmit them to stack 7-ᵇ.

The conduit 8 has connection with the cooling chamber or condenser and feed water heater 11 and a water collecting chamber and seal 12.

13 is an absorber for the removal of $CO_2$. As shown it contains shelves which may be covered with a quick lime, hydrated lime or partially slaked lime by means of which carbon dioxid is removed from the gas. Any other suitable washing or absorbing material or device may be used as for instance solutions of the caustic alkalies.

The gas passing from the chamber 12 to the absorber 13 may be diverted through a by-pass connection including a chilling device 15, and a compressor and accessory elements, indicated as a whole by 14, for liquefying and removing a portion of the carbon dioxid, thereby giving a valuable by-product. Freed of most of its carbon dioxid, the gas passes to the absorber through pipe 20. A purifier is shown at 16 for the removal of carbon monoxid. Pipe 17 conducts away the purified gas from this purifier.

18 is a superheater for bringing steam from the boiler up to temperature.

19 is a valved pipe for abstracting such steam from the boiler as may not be required in the process for other uses.

The operation of the apparatus in carrying out this invention is as follows:—Air is first blown through the pipe 2 into the mass of fuel contained in generator 1. The products of this reaction, consisting chiefly of carbon dioxid, carbon monoxid and nitrogen, are discharged from the outlet of the generator into the reaction chambers 4 and 4ᵃ. On entering the reaction chambers the gases meet with air from the air inlets and further combustion takes place in the checker work, heating the latter to a high temperature. The products of combustion then pass through the steam generator 7, from which they escape to the stack. When the generator and chambers 4, 4ᵃ have been heated to the proper temperature the air blast is stopped and steam is admitted to the generator through the pipe 3. Water-gas is thereby produced and passes through the connecting conduit 5 into the reaction chamber 4. In the conduit 5 steam is admitted through the nozzle 6. The mixture of water-gas and steam passes through the hot checker work 4 and 4-ᵃ and the carbon monoxid is oxidized to carbon dioxid. The mixture thereupon passes through the passage 8 to the cooler and condenser 9— 11 where the excess of steam is condensed and is collected in the chamber 12. The gas now containing chiefly hydrogen and carbon dioxid is passed to the purifier 13 in which the carbon dioxid is removed by absorption. The fuel bed in the generator 1 need not be as deep as that ordinarily employed in the manufacture of water-gas. Neither should its temperature be as high. A thin fire and a low temperature (600°–850° C) favor the reaction:—

$$C + 2H_2O = CO_2 + 2H_2$$

resulting in diminished carbon monoxid, and consequently in less oxidation to be effected in the reaction chambers. The latter should be maintained at the highest temperature possible during the course of oxidation as steam does not readily and completely oxidize carbon monoxid at low temperatures. It is therefore frequently desirable during the air blow to hold back the temperature of the generator by the injection of small quantities of steam or other cooling agent and to proportion the air supplied to the reaction chambers to afford the development of a high temperature therein.

The reaction $CO + H_2O = CO_2 + H_2$ is a reversible one, but only at very high temperatures does it go the other way to any appreciable extent, or in other words the reaction $CO_2 + H_2 = CO + H_2O$ is not likely to occur to any marked degree at the temperature at which the reaction chambers are maintained. An excess of steam by its mass action prevents the reaction altogether.

The apparatus is depicted merely diagrammatically and it is obvious that many forms of apparatus are suitable for carrying out this invention.

Other forms of producer and steam generators may of course be used in performing the process described and claimed and the moisture in the gas mixture leaving the checkerworks may be removed in any suitable manner. The steam introduced into the gas mixture passing into the checkerwork chambers may very advantageously be as hot as possible. The separation of carbon dioxid from the hydrogen may also be effected in a number of different ways. By cooling and compressing the mixed gases it is possible to liquefy the carbon dioxid and thereby separate it from the hydrogen. The hydrogen so produced may be further purified if desired or may be immediately used, or it may be compressed in tanks and preserved indefinitely for use. Cuprous chlorid, chromic acid or other compound capable of absorbing carbon monoxid may be used in the chamber 16 when hydrogen of great purity is demanded. In case quick lime or other desiccating compounds are not used for removal of carbon dioxid it is generally necessary to dry the gas coming from the chamber 13. Of course, if the carbon dioxid is removed by liquefaction such treatment is unnecessary. The chamber 4 if desired may contain a catalytic body; that is, a compound which favors the reaction between carbon monoxid and hydrogen without in itself necessarily undergoing ultimate change. Iron, nickel and manganese compounds, among others, are suitable for this purpose.

Among the advantages of this invention are the following:—Hydrogen of sufficient purity for purpose above mentioned is produced at a cost which compared with present methods of manufacture (such as the acid or electrolytic) is very low. The equipment required for its production is inexpensive and not subject to deterioration. Any water-gas plant may be used for the purpose when not employed for making illuminating gas. Another advantageous feature is the rapidity of production. The importance of a rapid rate of generation is appreciated when one considers that some 10,000 cubic feet of hydrogen may be required to fill a single balloon, an operation which has to be effected in a short space of time.

What we claim is,

1. The process of producing hydrogen which consists in blowing up a gas producer with an air draft current, burning the gaseous products in a refractory walled region to heat the same, then running the producer with a draft comprising steam, mixing the water gas produced with steam, passing the mixture through the refractory walled region to convert carbon monoxid into carbon dioxid, removing the carbon dioxid produced and collecting the hydrogen, and repeating the alternation.

2. The process of producing hydrogen which consists in heating a checkerwork of indifferent refractory material by burning hot gas therein, passing a mixture of water gas and steam through the checkerwork, removing the carbon dioxid from the gaseous mixture produced in this passage and collecting the hydrogen for use, and repeating the alternation.

3. The process of producing hydrogen which consists in burning hot producer gas in a checkerwork of indifferent refractory material, passing a mixture of water gas and superheated steam through the heated checkerwork, removing the carbon dioxid produced in this passage and collecting the hydrogen, and repeating the alternation.

4. The process of producing hydrogen and by-products which consists in blowing up a gas producer with an air draft current, burning the gaseous products of the blow in a refractory walled region to heat the same, then running the producer with a draft comprising steam, mixing the water gas produced with steam, passing the mixture through the refractory walled region to convert carbon monoxid into carbon dioxid, liquefying out the carbon dioxid from the gaseous products and collecting the hydrogen, and repeating the alternation.

5. The process of producing hydrogen and by-products which consists in blowing up a gas producer with an air draft current, burning the gaseous products of the blow in a refractory walled region to heat the same and generating steam with the products of combustion passing therefrom, then running the producer with a draft comprising steam, mixing the water gas with a portion of the steam generated, passing the mixture through the refractory walled region to convert carbon monoxid into carbon dioxid, removing the carbon dioxid produced and collecting the hydrogen for use, and repeating the alternation.

6. The process of producing hydrogen and by-products which consists in blowing up a gas producer with an air draft current, burning the gaseous products of the blow in a checkerwork of indifferent refractory material to heat the same and generating steam with the products of combustion passing therefrom, then running the producer with a draft current comprising steam, mixing the water gas with a portion of the steam generated, passing the mixture through the checkerwork to convert carbon monoxid into carbon dioxid, liquefying out the dioxid from the gaseous products, and collecting the hydrogen, and repeating the alternation.

Signed at New York, in the county of New York, and State of New York, this 29th day of September, A. D. 1905.

CARLETON ELLIS.
BYRON E. ELDRED.

Witnesses:
WARREN E. DIXON,
JAS. K. CLARK.